(12) United States Patent
Alghamdi et al.

(10) Patent No.: US 11,384,277 B2
(45) Date of Patent: Jul. 12, 2022

(54) MANGANESE-ASSISTED WATERFLOODING PROCESSES FOR ENHANCED OIL RECOVERY IN CARBONATE FORMATIONS

(71) Applicant: SAUDI ARABIAN OIL COMPANY, Dhahran (SA)

(72) Inventors: Amani O. Alghamdi, Dhahran (SA); Subhash C. Ayirala, Dhahran (SA); Mohammed Badri Alotaibi, Dhahran (SA); Sultan M. Enezi, Dammam (SA); Ali Abdallah Alyousef, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 17/318,338

(22) Filed: May 12, 2021

(65) Prior Publication Data

US 2021/0355368 A1 Nov. 18, 2021

Related U.S. Application Data

(60) Provisional application No. 63/023,393, filed on May 12, 2020.

(51) Int. Cl.
*E21B 43/20* (2006.01)
*C09K 8/58* (2006.01)

(52) U.S. Cl.
CPC .............. *C09K 8/58* (2013.01); *E21B 43/20* (2013.01)

(58) Field of Classification Search
CPC .................................. C09K 8/58; E21B 43/20
See application file for complete search history.

(56) References Cited

U.S. PATENT DOCUMENTS

| | | | |
|---|---|---|---|
| 4,846,274 A | 7/1989 | Clough | |
| 5,532,212 A * | 7/1996 | Patel | C09K 8/16 507/140 |
| 8,327,935 B2 | 12/2012 | Crill | |
| 8,361,938 B1 | 1/2013 | Creasey | |
| 10,041,339 B2 * | 8/2018 | Jerauld | E21B 43/16 |
| 10,081,753 B2 | 9/2018 | Wu et al. | |
| 10,214,683 B2 | 2/2019 | Neil et al. | |
| 2011/0035154 A1 * | 2/2011 | Kendall | C04B 7/364 702/14 |
| 2012/0125604 A1 * | 5/2012 | Willingham | C09K 8/58 166/270.1 |
| 2016/0272873 A1 * | 9/2016 | Mahadevan | C09K 8/58 |
| 2018/0112125 A1 | 4/2018 | Wu et al. | |
| 2018/0327650 A1 * | 11/2018 | Yousef | C09K 8/58 |

FOREIGN PATENT DOCUMENTS

| | | |
|---|---|---|
| WO | 2013174679 A1 | 11/2013 |
| WO | 2014053912 A1 | 4/2014 |
| WO | 2015086779 A1 | 6/2015 |
| WO | 2016153934 A1 | 9/2016 |

OTHER PUBLICATIONS

International Search Report and Written Opinion of PCT Application No. PCT/US2021/070544 dated Sep. 7, 2021: pp. 1-10.

* cited by examiner

*Primary Examiner* — Silvana C Runyan
(74) *Attorney, Agent, or Firm* — Bracewell LLP; Constance Gall Rhebergen

(57) ABSTRACT

Method for enhancing oil recovery in a hydrocarbon-containing carbonate reservoir including: injecting a slug of an oil recovery solution into the carbonate reservoir such that the wettability of a rock surface of the hydrocarbon-containing reservoir is altered toward more water-wet; and injecting a slug of a displacing fluid into the hydrocarbon-containing carbonate reservoir formation after injecting the slug of the oil recovery solution. The oil recovery solution comprising: a manganese-bearing aqueous solution having manganese ions and one or more major ions. The aqueous saline solution having a concentration of manganese ions between 100 and 1,000 ppm TDS and a concentration of major ions that is equivalent to the concentration of major ions in seawater as it is found in nature. The one or more major ions can include: sodium ion, magnesium ion, calcium ion, chlorine ion, sulfate ion, bicarbonate ion, and combinations of the same.

18 Claims, 2 Drawing Sheets

MANGANESE-ASSISTED WATERFLOODING PROCESSES FOR ENHANCED OIL RECOVERY IN CARBONATE FORMATIONS

INCORPORATION BY REFERENCE

This application claims priority from U.S. Provisional Application No. 63/023,393, filed on May 12, 2020, the contents of which are incorporated by reference in their entirety.

TECHNICAL FIELD

Embodiments of the disclosure generally relate to enhanced oil recovery compositions and methods for treating oil-bearing reservoirs and formations to obtain hydrocarbons by improving the mobility of oil.

BACKGROUND

Enhanced oil recovery techniques have been developed to restore formation pressure, improve oil displacement, and improve fluid flow in existing reservoirs. Enhanced oil recovery techniques in modern gas operations can include chemical, gas, thermal, and microbial-based processes.

Waterflooding has been used as an enhanced oil recovery technique to maintain reservoir pressures and displace liquid hydrocarbons toward producing wells. Hydrocarbons can be recovered in some reservoirs by waterflooding with low-salinity compositions. However, substantial investments in equipment and operating costs are needed to prepare and produce conventional low-salinity solutions in the field for waterflooding.

SUMMARY

Waterflooding processes may be used in enhanced oil recovery operations in carbonate reservoirs to increase oil production. For example, waterflooding with manganese-bearing aqueous solutions in carbonate reservoirs can alter wettability of rock and brine interfaces for improved oil recovery. Disclosed are compositions and methods for enhancing oil recovery in a carbonate reservoir.

A method for enhancing oil recovery in a hydrocarbon-containing carbonate reservoir is disclosed. The method includes injecting a slug of an oil recovery solution into the carbonate reservoir such that wettability of a rock surface of the hydrocarbon-containing carbonate reservoir is altered; and injecting a slug of a displacing fluid into the hydrocarbon-containing carbonate reservoir after injecting the slug of the oil recovery solution. The manganese-bearing aqueous solution includes manganese ions and major ions. The major ions include at least one of the following: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$). The manganese-bearing aqueous solution can have a concentration of manganese ions in the range of 100-1,000 parts per million (ppm) total dissolved solids (TDS) and a concentration of major ions that is equivalent to the concentration of major ions in natural seawater.

In some embodiments, the oil recovery solution includes manganese sulfate ($MnSO_4$). In some embodiments, the oil recovery solution includes manganese dichloride. In some embodiments, the slug of the oil recovery solution has a volume in the range of 0.3-0.5 pore volumes of the carbonate reservoir. In some embodiments, the slug of the displacing fluid has a volume in the range of 0.5-1.0 pore volumes of the carbonate reservoir. In some embodiments, the concentration of major ions in the manganese-bearing aqueous solution is in the range of 34,000-60,000 ppm TDS. In some embodiments, the displacing fluid can include seawater.

A method for enhancing oil recovery in a hydrocarbon-containing carbonate reservoir is disclosed. The method includes injecting a slug of an oil recovery solution into the hydrocarbon-containing carbonate reservoir such that wettability of a rock surface of the hydrocarbon-containing carbonate reservoir is altered; and injecting a slug of a displacing fluid into the hydrocarbon-containing carbonate reservoir after injecting the slug of the oil recovery solution. The oil recovery solution includes a manganese-bearing aqueous solution that includes manganese ions ($Mn^{2+}$) and one or more major ions. The major ions can include at least one of the following: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$). The manganese-bearing aqueous solution can have a concentration of manganese ions in the range of 100-1,000 ppm TDS and a major ionic concentration of major ions in the range of 5,000-7,000 ppm TDS.

In some embodiments, the manganese-bearing aqueous solution can include manganese sulfate. In some embodiments, the manganese-bearing aqueous solution can include manganese sulfate. In some embodiments, the slug of the oil recovery solution has a volume in the range of 0.3-0.5 pore volumes of the carbonate reservoir. In some embodiments the slug of the displacing fluid has a volume in the range of 0.5-1.0 pore volumes of the carbonate reservoir. In some embodiments, the displacing fluid includes seawater.

A method for enhancing oil recovery in a hydrocarbon-containing carbonate reservoir is disclosed. The method includes injecting a slug of a first oil recovery solution into the hydrocarbon-containing carbonate reservoir such that wettability of a rock surface of the hydrocarbon-containing carbonate reservoir is altered; injecting a slug of a second oil recovery solution into the hydrocarbon-containing carbonate reservoir formation after injecting the slug of the first oil recovery solution; and injecting a slug of a displacing fluid into the hydrocarbon-containing carbonate reservoir formation after injecting the slug of the second oil recovery solution. The first oil recovery solution includes a manganese-bearing aqueous solution having manganese ions and one or more major ions. The major ions include at least one of the following: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$). The first oil recovery solution has a concentration of manganese ions that is in the range of 100-1,000 ppm TDS and concentration of major ions in the range of 5,000-7,000 ppm TDS. The nonmanganese-bearing aqueous solution has a concentration of the major ions in the range of 5,000-7,000 ppm TDS and a concentration of manganese ions that is less than 100 ppm TDS.

In some embodiments, the first oil recovery solution includes manganese sulfate ($MnSO_4$). In some embodiments, the slug of the first oil recovery solution has a volume in the range of 0.3-0.5 pore volumes of the carbonate reservoir. In some embodiments, the slug of the second oil recovery solution has a volume in the range of 0.3-0.5 pore volumes of the carbonate reservoir. In some embodiments, the slug of the displacing fluid has a volume in the range of 0.5-1.0 pore volumes of the carbonate reservoir. In some embodiments, the displacing fluid includes seawater.

BRIEF DESCRIPTION OF THE DRAWINGS

The embodiments disclosed here will be understood by the following detailed description along with the accompanying drawings. The embodiments shown in the figures only illustrate several embodiments of the disclosure. The disclosure admits of other embodiments not shown in the figures, and is not limited to the content of the illustrations.

DETAILED DESCRIPTION

Figure 1:
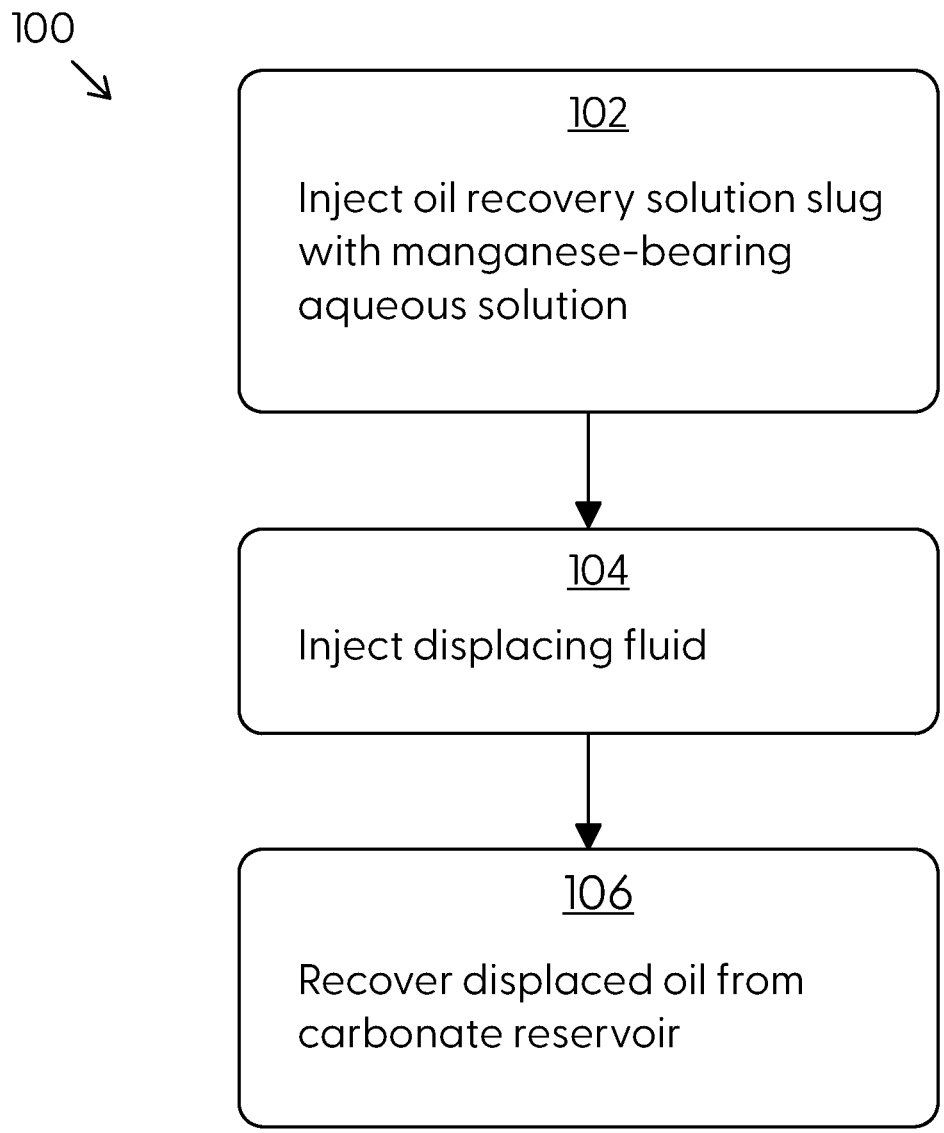
FIG. 1 is a block diagram of a method for enhanced recovery of oil using one slug of an oil recovery solution that includes natural seawater.

This disclosure describes various embodiments related to methods and compositions for enhancing oil recovery in a carbonate reservoir having a rock surface with wettability characteristics.

For certain embodiments, many details are provided for thorough understanding of the various components or steps. In other instances, well-known processes, devices, compositions, and systems are not described in particular detail so that the embodiments are not obscured by detail. Likewise, illustrations of the various embodiments can omit certain features or details so that various embodiments are not obscured.

The drawings provide an illustration of certain embodiments. Other embodiments can be used, and logical changes can be made without departing from the scope of this disclosure. The following detailed description and the embodiments it describes should not to be taken in a limiting sense. This disclosure is intended to disclose certain embodiments with the understanding that many other undisclosed changes and modifications can fall within the spirit and scope of the disclosure. The patentable scope is defined by the claims, and can include other examples that occur to those of hypothetical ordinary skill in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," or "in embodiments," which can each refer to one or more of the same or different embodiments. Furthermore, the terms "comprising," "including," "having," and the like, as used with respect to embodiments of the present disclosure, are synonymous.

In this disclosure and the appended claims, unless otherwise indicated, all numbers expressing quantities, percentages or proportions, and other numerical values used in the specification and claims are to be understood as being modified in all instances by the term "about." The term "about" applies to all numeric values, whether or not explicitly indicated. Values modified by the term "about" include a deviation of ±5% of the given value unless the deviation changes the nature or effect of the value such that it is not operable to achieve its intended purpose. For example, an expressed value of about 5,000-7,000 ppm TDS includes 4,750-7,350 ppm TDS as long as the given values are operable to achieve their intended purposes; but if, for example, a concentration of less than 5,000 ppm TDS is not operable to achieve its intended purpose, then the range could include 5,000-7,350 ppm TDS.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit as well as the upper limit and the lower limit and includes smaller ranges of the interval subject to any specific exclusion provided. Unless otherwise specified, ionic concentrations disclosed are expressed in parts per million by mass.

Unless otherwise defined, all technical and scientific terms used in this specification and the appended claims have the same meanings as commonly understood by one of hypothetical ordinary skill in the relevant art.

Where a method comprising two or more defined steps is recited or referenced in this disclosure or the appended claims, the defined steps can be carried out in any order or simultaneously except where the context excludes that possibility.

As used in this disclosure, the term "natural seawater" refers to seawater having major ions in concentrations that are equivalent to those generally occurring in seawater as it is presently found in nature at open sea. The word "natural" is only used to describe the unaltered ionic composition of major ions in seawater as it is found in nature at open sea. Natural seawater may be treated or altered in a number of ways that do not significantly alter its composition of major ions. For example, natural seawater includes seawater that is filtered to remove suspended solids, seawater that is treated to remove macro- and microorganisms, seawater that has been deoxygenated, and seawater that is treated using any combination of these processes.

As used throughout this disclosure, "pore volume" refers to the cumulative volume of the fluid-filled void spaces in the in-situ rock of the reservoir between the injection well and the production well. Pore volumes can be derived from the bulk rock volume and the porosity of the in-situ rock. Porosity of the in-situ rock can be determined from well logs in the field or using standard techniques, such as volume saturation of core samples with brine in a lab environment. Injection slug volumes can be determined on a pore volume basis.

As used throughout this disclosure, the term "manganese ions" refers to manganese ions present initially in an oxidation state of 2+($Mn^{2+}$). Suitable sources of manganese ions can include salts such as manganese sulfate ($MnSO_4$) and manganese chloride ($MnCl_2$). After being introduced to a reservoir, manganese ions can interact with reservoir rock, fluids, or both, resulting in other oxidation states.

The oil recovery solutions and processes described in this disclosure may improve oil recovery from a reservoir as compared to conventional enhanced oil recovery solutions. In some embodiments, the compositions and processes described in the disclosure may be particularly suitable for maximizing oil recovery in carbonate reservoirs.

The oil recovery solution includes a manganese-bearing aqueous solution with a concentration of manganese ions and major ions. The major ions can be selected from the following group: sodium ions ($Na^+$), magnesium ions ($Mg^{2+}$), calcium ions ($Ca^{2+}$), chloride ions ($Cl^-$), sulfate ions ($SO_4^{2-}$), bicarbonate ions ($HCO_3^-$), and combinations of the same. Divalent ions such as calcium ions, magnesium ions, and sulfate ions are particularly useful in the manganese-bearing aqueous solution for use in carbonate reservoirs. These divalent ions are usually considered potential-determining ions for carbonate surfaces, and can directly affect the surface charge of carbonate surfaces and contribute to electric double layer expansion. The manganese ions together with potential-determining ions of the manganese-bearing aqueous solution can alter the surface charge at the reservoir rock surface to shift wettability towards water-wet (that is, having an attraction preference for water over oil) and improve the release of oil. Not intending to be bound by any particular technical theory, it is believed that the combination of manganese ions with major ions produces a favorable electrokinetic interaction; that is, electrical double layer expansion at rock and brine interfaces. In some embodiments, the concentration of manganese ions in the manganese-bearing aqueous solution can be in the range of about 100-1,000 ppm TDS, alternatively in the range of about 100-900 ppm TDS. A concentration of manganese ions greater than about 1,000 ppm TDS in the manganese-bearing aqueous solution is unsuitable because it will likely lead to the precipitation of manganese carbonate ($MnCO_3$), which may block pore spaces in the rock. According to at least one embodiment, the most prevalent ions in the oil recovery solution are selected from the group consisting of manganese ions and major ions; other ions, if any, are only present in lesser concentrations.

In some embodiments, the manganese-bearing aqueous solution can have low salinity (that is, lower salinity than is found in natural seawater) and a major ionic concentration (that is, the total concentration of all dissolved major ions) in the range of about 5,100-8,000 ppm TDS. In some embodiments, the manganese-bearing aqueous solution can have high salinity and a major ionic concentration in the range of about 34,000-60,000 ppm TDS, with total ionic concentration in the range of about 35,100-61,000 ppm TDS.

The manganese-bearing aqueous solution can have a pH in the range of about 5-8. More acidic solutions are not very suitable for inducing favorable wettability alteration in carbonates, and may react with carbonate rock in the reservoir causing damage to the reservoir.

In some embodiments, a first oil recovery solution includes the manganese-bearing aqueous solution and a second oil recovery solution includes a nonmanganese-bearing aqueous solution. The nonmanganese-bearing aqueous solution includes major ions and has a concentration of manganese ions that is less than about 100 ppm TDS, which includes zero concentration of manganese ions. The total concentration of major ions in the nonmanganese-bearing aqueous solution can be in the range of about 5,100-8,000 ppm TDS before mixing with the manganese salt.

The major ions can be selected from the following group: sodium ions ($Na^+$), magnesium ions ($Mg^{2+}$), calcium ions ($Ca^{2+}$), chloride ions ($Cl^-$), sulfate ions ($SO_4^{2-}$), bicarbonate ions ($HCO_3^-$), and combinations of the same. Potential-determining ions such as calcium ions, magnesium ions, sulfate ions, or combinations of the same are particularly useful in the manganese-bearing aqueous solution to achieve suitable electric double layer expansion. The manganese-bearing aqueous solution can have manganese ions in the range of about 100-1,000 ppm TDS, alternatively in the range of about 100-900 ppm TDS. In some embodiments, the manganese-bearing aqueous solution can have a major ionic concentration in the range of about 5,100-8,000 ppm TDS. In some embodiments, the manganese-bearing aqueous solution can have a major ionic concentration in the range of about 34,000-60,000 ppm TDS, with total ionic concentration of about 35,100-61,000 ppm TDS.

The manganese-bearing aqueous solution in some embodiments, particularly those having major ionic concentration in the range of about 5,100-8,000 ppm TDS, can have a concentration of magnesium ions in the range of about 200-300 ppm TDS, sulfate ions in the range of about 300-500 ppm TDS, calcium ions in the range of about 10-100 ppm TDS, chloride ions in the range of about 2,700-4,000 ppm TDS, sodium ions in the range of about 1,500-2,200 ppm TDS, or bicarbonate ions in the range of about 2-30 ppm TDS, or combinations of the same.

The manganese-bearing aqueous solution in some embodiments having major ionic concentration in the range of about 34,000-60,000 ppm TDS can have a concentration of magnesium ions in the range of about 1,400-2,400 ppm TDS, sulfate ions in the range of about 2,400-4,700 ppm TDS, calcium ions in the range of about 300-1,000 ppm TDS, chloride ions in the range of about 19,000-35,000 ppm TDS, sodium ions in the range of about 10,000-19,000 ppm TDS, or bicarbonate ions in the range of about 2-200 ppm TDS, or combinations of the same.

The manganese-bearing aqueous solution can be prepared by mixing a manganese salt such as manganese sulfate ($MnSO_4$) or manganese dichloride ($MnCl_2$) with an aqueous saline solution having major ions. The manganese-bearing aqueous solution can be prepared by mixing the manganese salt and aqueous saline solution at a temperature in the range of about 0-100° C., alternatively in the range of about 0-60° C., alternatively in the range of about 0-45° C. The manganese-bearing aqueous solution can be prepared by mixing the manganese salt and aqueous saline solution under ambient pressure, alternatively a pressure in the range of about 0.90-1.1 bar. In some embodiments, the aqueous saline solution can have a low major ionic concentration (that is, a major ionic concentration less than that found in natural seawater), in the range of about 5,000-7,000 ppm TDS before combining with the manganese salt.

In some embodiments, the aqueous saline solution has a major ionic concentration that is less than the major ionic concentration in natural seawater. In such embodiments, the manganese salt may be in the absence of manganese dichloride. The addition of manganese dichloride to an aqueous saline solution with a major ionic concentration less than the major ionic concentration of natural seawater can cause manganese carbonate ($MnCO_3$) to precipitate and can negatively affect the wettability of rock and brine interfaces. However, manganese dichloride is suitable for use with an aqueous saline solution having a major ionic concentration that is equal to or greater than the major ionic concentration of natural seawater to effectively alter rock and brine interfaces toward water-wet without the precipitation of manganese carbonate. Not intending to be bound by any particular technical theory, it is believed that manganese carbonate cannot nucleate in carbonate-rich recent sediments unless the concentration of magnesium ions in solution is less than the concentration of magnesium ions found in natural seawater.

In some embodiments, the aqueous saline solution can be prepared from seawater that has been treated to have a low major ionic concentration. Seawater can be treated to reduce the major ionic concentration so that the major ionic concentration in the treated seawater is in the range of about 5,000-7,000 ppm TDS. Techniques known to one of ordinary skill in the relevant art (e.g., dilution, filtration, osmosis, etc.) can be used to reduce major ionic concentration of seawater to suitable concentrations.

Natural seawater is known to include major ions from dissolved inorganic salts. Major ions in seawater include sodium ion, magnesium ion, calcium ion, sulfate ion, chlorine ion, and bicarbonate ion. Other ionic constituents including potassium ion ($K^+$), strontium ion ($Sr^{2+}$), and bromide ion (Br) may also be present. Manganese can also be found in very low concentrations (that is, between about 0.01 and about 50 ppm TDS) in natural seawater. The composition of seawater tends to be relatively homogenous because of physical mixing caused by phenomena such as thermohaline circulation and wind-driven circulation. However, the composition of seawater can vary at any given location depending on a number of factors including mixing with local sources of fresh water, and varying rates of evaporation and precipitation.

The major ionic concentration of natural seawater is generally in the range of about 34,000-60,000 ppm TDS before mixing with the manganese salt. The majority of dissolved salts in natural seawater include the following ions in descending order of prevalence: chloride ion, sodium ion, magnesium ion, sulfate ion, calcium ion, potassium ion, bromide ion, and bicarbonate ion. Generally, chloride ions represent about 55% of ions in natural seawater by mass, sodium ions represent about 31%, magnesium ions represent about 4%, sulfate ions represent about 7%, calcium ions represent about 1%, potassium ions represent about 1%, bromide ions represent about 0.2%, and bicarbonate ions represent about 0.2%. These proportions are generally maintained across the range of salinity in natural seawater. By way of example and not intending to be limiting, the major ionic composition of a sample of natural seawater having total major ionic concentration of 57,610 ppm TDS is provided in Table 1.

TABLE 1

Major ion composition of natural seawater having major ionic concentration of 57,610 ppm TDS

| | Concentration (ppm TDS) |
|---|---|
| Cations | |
| Sodium ion | 18,240 |
| Magnesium ion | 2,110 |
| Calcium ion | 650 |
| Anions | |
| Sulfate ion | 4,290 |
| Chloride ion | 32,200 |
| Bicarbonate ion | 120 |

FIG. 1 shows a process 100 for enhancing oil recovery from a carbonate reservoir using a slug of oil recovery solution having a manganese bearing aqueous solution. Initially, a slug of oil recovery solution having a manganese-bearing aqueous solution that includes manganese ions and natural seawater is injected into the carbonate reservoir (block 102). The manganese-bearing aqueous solution has a concentration of manganese ions in the range of about 100-1,000 ppm TDS, alternatively in the range of about 100-900 ppm TDS, and can be prepared by adding a manganese salt such as manganese sulfate to natural seawater. The natural seawater can have major ions in a concentration of about 34,000-60,000 ppm TDS before adding the manganese salt. The oil recovery solution may alter the wettability of a rock surface of the reservoir and brine in the reservoir toward water-wet. In some embodiments, the oil recovery solution can have a volume in the range of about 0.3-0.5 pore volume of the reservoir. This slug size range is sufficient to alter wettability while minimizing the amount of manganese salts used to produce the manganese-bearing aqueous solution.

After injecting the slug of oil recovery solution, a displacing fluid is injected into the carbonate reservoir to drive hydrocarbons and the oil recovery solution toward the producing well (block 104). In some embodiments, the displacing fluid can be seawater. In some embodiments, the displacing fluid is injected with a volume in the range of about 0.5-1.0 pore volume. Finally, hydrocarbons are recovered from the carbonate reservoir (block 106) using techniques known by a person of hypothetical ordinary skill in the art.

Figure 2:
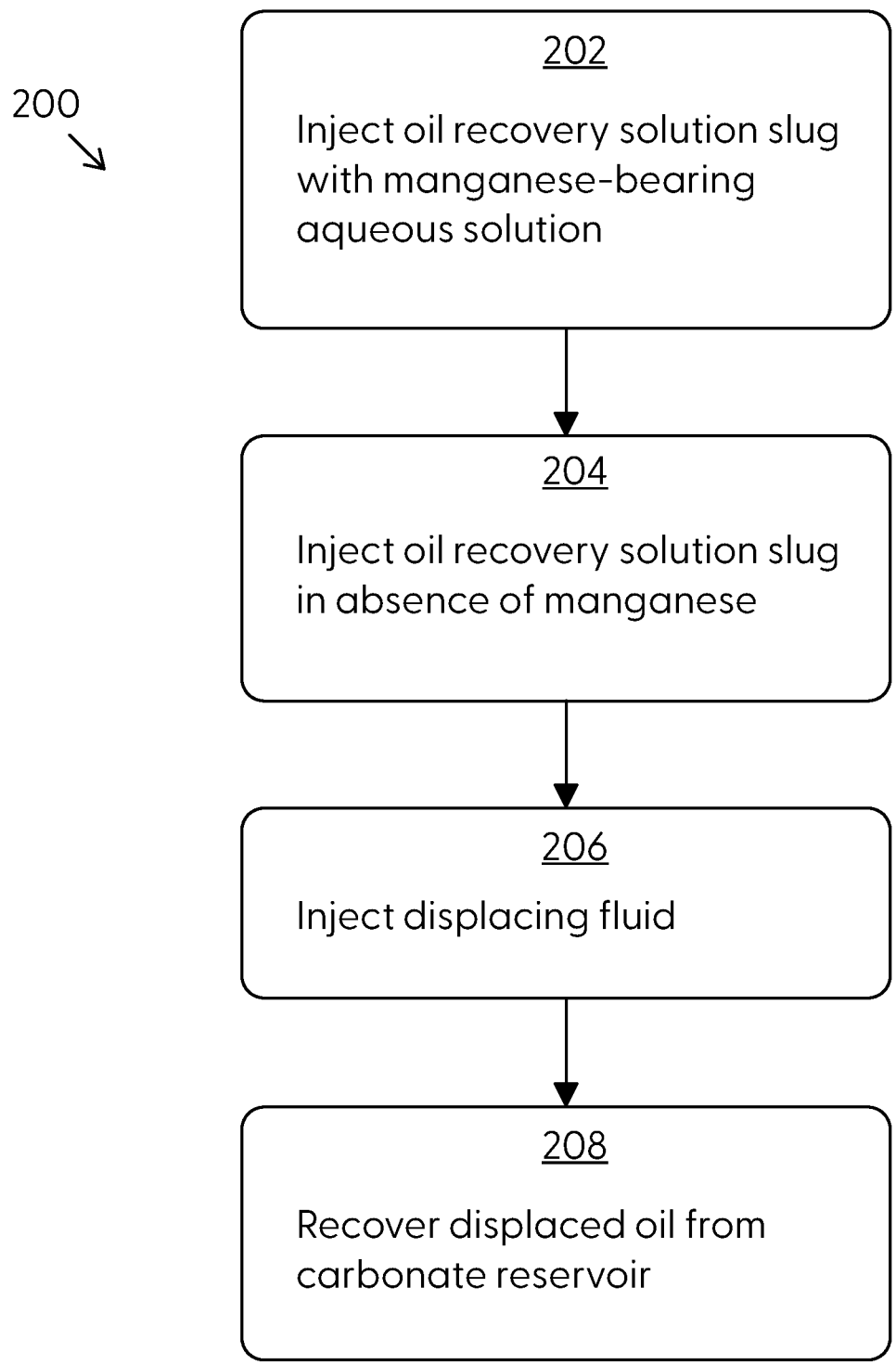
FIG. 2 is a block diagram of a method for enhanced recovery of oil using a slug of a first oil recovery solution having low salinity, and a slug of a second oil recovery solution having low salinity.

FIG. 2 shows a process 200 for enhancing oil recovery from a carbonate reservoir using slug of a first oil recovery solution and a slug of a second oil recovery solution. Initially, a slug of first oil recovery solution having a manganese-bearing aqueous solution with a concentration of manganese ions in the range of about 100-1,000 ppm TDS, alternatively in the range of about 100-900 ppm TDS, and major ionic concentration in the range of about 5,000-7,000 ppm TDS, a total ionic concentration in the range of about 5,100-8,000 ppm TDS, is injected into the carbonate reservoir (block 202). The first oil recovery solution can shift wettability of a rock surface of the reservoir and brine in the reservoir toward water-wet. The manganese-bearing aqueous solution can be prepared by mixing a manganese salt such as manganese sulfate or manganese dichloride with an aqueous saline solution having major ionic concentration in the range of about 5,000-7,000 ppm TDS. In some embodiments, the slug of the first oil recovery solution has a volume in the range of about 0.3-0.5 pore volume. This slug size range is sufficient to alter wettability while minimizing the amount of manganese salts used to produce the manganese-bearing aqueous solution.

After injecting the slug of the first oil recovery solution, the slug of the second oil recovery solution is injected into the carbonate reservoir (block 204). The second oil recovery solution can have a concentration of manganese ions less than about 10 ppm TDS, which includes zero concentration of manganese ions. In some embodiments, the second oil recovery solution has a major ionic concentration in the range of about 5,000-7,000 ppm TDS. In some embodiments, the slug of the second oil recovery solution has a volume in the range of about 0.3-0.5 pore volume. Here, the second oil recovery solution is used to drive the slug of the first oil recovery solution. Because the second oil recovery solution has similar salinity with a concentration of manganese ions that is less than about 10 ppm TDS, the second oil recovery is useful to maintain the wettability alteration caused by the first oil recovery solution.

After injecting the slug of the second oil recovery solution, the displacing fluid is injected into the carbonate reservoir to drive hydrocarbons and the preceding slugs toward the producing well (block 206). In some embodiments, the displacing fluid is seawater. In some embodiments, the displacing fluid is injected with a volume in the range of about 0.5-1.0 pore volume. Finally, hydrocarbons are extracted from the carbonate reservoir using techniques known by a person of hypothetical ordinary skill in the art.

Examples

The following examples are included to demonstrate embodiments of the disclosure, and should be considered nonlimiting. The techniques and compositions disclosed in the examples which follow represent techniques and compositions discovered to perform well in the practice of the disclosure, and thus can be considered to constitute modes for its practice. However, changes can be made to the embodiments disclosed in the examples without departing from the spirit and scope of the disclosure. In the examples that follow, all measurements were taken at a temperature of about 25° C.

Calcite Suspension and Oil Emulsion with High Salinity and Manganese Ions from Manganese Sulfate.

The following nonlimiting examples of manganese-bearing aqueous solutions having high salinity and manganese ions from manganese sulfate were evaluated by analyzing the electrokinetic potential of calcite suspensions and oil emulsions in three manganese-bearing aqueous solutions. For comparison, the electrokinetic potentials of a calcite suspension and oil emulsion in a nonmanganese-bearing aqueous solution were also analyzed. The three manganese-bearing aqueous solutions were prepared by mixing varying amounts of manganese sulfate with natural seawater. Natural seawater without any additional manganese ions or additives was used for the nonmanganese-bearing aqueous solution. The natural seawater used in each of the examples had major ionic concentration as tabulated in Table 1 and manganese concentration of between 0 and 10 ppm TDS. The resulting electrokinetic potential (expressed in millivolts (mV)) for each trial is shown in Table 2.

TABLE 2

Comparison of electrokinetic potential in a calcite suspension and oil emulsion with high salinity and varying concentrations of manganese ions from manganese sulfate

| Manganese ions (ppm TDS) | Electrokinetic potential (mV) | |
|---|---|---|
| | Calcite suspension | Oil emulsion |
| 0 | +5.94 | −0.2 |
| 100 | −1.67 | −1.32 |
| 500 | −0.7 | −5.69 |
| 1,000 | −2.2 | −0.37 |

In the calcite suspension, the nonmanganese-bearing aqueous solution had positive electrokinetic potential, while the interfaces of calcite with manganese-bearing aqueous solutions having manganese ions in the range of about 100-1,000 ppm TDS each had negative electrokinetic potential. Not intending to be bound by any technical theory, it is believed that positive electrokinetic potential is indicative of oil-wet characteristics and negative electrokinetic potential is indicative of water-wet characteristics. The shift from positive to negative electrokinetic potential with the addition of manganese ions from manganese sulfate indicates a shift from oil-wet characteristics to water-wet characteristics.

In the oil emulsion, the natural seawater had slightly negative electrokinetic potential, which is indicative of mixed- or moderately water-wet characteristics. Not intending to be limited by theory, it is believed that the negative potentials at both the calcite suspension interface and the oil emulsion interface generate strong repulsive forces between the two interfaces, thus causing residual oil to detach from the carbonate rock. As tabulated in Table 2, the oil emulsion with manganese-bearing aqueous solutions having 100, 500, and 1,000 ppm TDS manganese ions from manganese sulfate each had more negative electrokinetic potential. Therefore, favorable wettability is either maintained or improved.

Calcite Suspension and Oil Emulsion with Low Salinity and Manganese Ions from Manganese Sulfate.

The following nonlimiting examples of manganese-bearing aqueous solutions having low salinity and manganese ions from manganese sulfate were evaluated by analyzing the electrokinetic potential of calcite suspensions in three manganese-bearing aqueous solutions. The three manganese-bearing aqueous solutions were prepared by mixing varying amounts of manganese sulfate with an aqueous saline solution having major ions in the following concentrations: sodium ion 1824 ppm TDS, magnesium ion 211 ppm TDS, calcium ion 65 ppm TDS, sulfate ion 429 ppm TDS, chloride ion 3220 ppm TDS, and bicarbonate ion 12 ppm TDS. A nonmanganese-bearing aqueous solution of low-salinity seawater was used as a base trial for comparison. The nonmanganese-bearing aqueous solution of low-salinity seawater had a major ion concentration of 5,761 ppm TDS and did not have a significant concentration (that is, greater than about 50 ppm TDS) of manganese ions. The concentration of manganese ions in the nonmanganese-bearing aqueous solution of low-salinity seawater for this example was about 0 ppm TDS. The resulting electrokinetic potential for each trial is shown in Table 3.

TABLE 3

Comparison of electrokinetic potential in a calcite suspension and oil emulsion with low salinity and varying concentrations of manganese ions from manganese sulfate

| Manganese ions (ppm TDS) | Electrokinetic potential (mV) | |
|---|---|---|
| | Calcite suspension | Oil emulsion |
| 0 | −7.96 | −7.58 |
| 100 | −5.82 | −21.18 |
| 500 | −6.94 | −10.49 |
| 1,000 | −15.74 | −5.69 |

For the calcite suspension, the base trial using low-salinity nonmanganese-bearing aqueous solution resulted in negative electrokinetic potential. Though the magnitude of the negative electrokinetic potential observed in trials using 100 and 500 ppm TDS manganese ions decreased slightly, the electrokinetic potential remained negative in each of the trials. The trial using 1,000 ppm TDS manganese ions resulted in a significant increase in the magnitude of the negative electrokinetic potential, indicating a significant shift toward more water-wet.

As for the oil emulsion, the base trial having a very low concentration, or zero concentration, of manganese ions already had negative electrokinetic potential. The electrokinetic potential of the trial using 1,000 ppm TDS manganese ions was less negative, but remained sufficiently negative to indicate water-wet characteristics. The trials using 100 and 500 ppm TDS resulted in a significantly more negative electrokinetic potential-particularly the trial using 100 ppm TDS manganese ions. That trial resulted in an electrokinetic potential change of −13.6 mV.

Calcite Suspension and Oil Emulsion with High Salinity and Manganese Ions from Manganese Dichloride.

The following nonlimiting example of a manganese-bearing aqueous solution having high salinity and manganese ions from manganese dichloride was evaluated by analyzing the electrokinetic potential of calcite suspensions and oil emulsions in a manganese-bearing aqueous solution. The manganese-bearing aqueous solution was prepared by mixing manganese dichloride with natural seawater. For comparison, a sample of natural seawater having the same ionic composition as the natural seawater used in the previous example was analyzed. The resulting electrokinetic potential data are shown in Table 4.

TABLE 4

Comparison of electrokinetic potential in a calcite suspension and an oil emulsion with high salinity and varying concentrations of manganese ions from manganese dichloride

| Manganese | Electrokinetic potential (mV) | |
| --- | --- | --- |
| ions (ppm TDS) | Calcite suspension | Oil emulsion |
| 0 | +5.94 | −0.2 |
| 1,000 | −0.69 | −2.24 |

As with the examples using a manganese-bearing aqueous solution prepared from manganese sulfate, the example using a manganese-bearing aqueous solution prepared from manganese dichloride with 1,000 ppm TDS manganese ions resulted in a change in electrokinetic potential from positive to negative in the calcite suspension. These data indicate that high salinity manganese-bearing aqueous solutions prepared from manganese dichloride can be used to alter the wettability of calcite rock surfaces toward water-wet.

As for the oil emulsion, the manganese-bearing aqueous solution having high salinity and manganese ions from manganese dichloride resulted in more negative electrokinetic potential at the oil-solution interface, indicating a shift toward more water-wet.

Calcite Suspension and Oil Emulsion with Low Salinity and Manganese Ions from Manganese Dichloride.

The following nonlimiting examples of manganese-bearing aqueous solutions having low salinity and manganese ions from manganese dichloride were evaluated similar to the previous examples. A manganese-bearing aqueous solution was prepared by mixing manganese dichloride with an aqueous saline solution having major ionic concentration of 5,761 ppm TDS. The concentrations of major ions in the aqueous saline solution were: sodium ion 1824 ppm TDS, magnesium ion 211 ppm TDS, calcium ion 65 ppm TDS, sulfate ion 429 ppm TDS, chloride ion 3220 ppm TDS, and bicarbonate ion 12 ppm TDS. A nonmanganese-bearing aqueous solution in the absence of a significant concentration of manganese ions, and having the same major ionic concentration as the aqueous saline solution was used as a base trial. The resulting electrokinetic potential for each trial is shown in Table 5.

TABLE 5

Comparison of electrokinetic potential in a calcite suspension and oil emulsion with low salinity and varying concentrations of manganese ions from manganese dichloride

| Manganese | Electrokinetic potential (mV) | |
| --- | --- | --- |
| ions (ppm TDS) | Calcite suspension | Oil emulsion |
| 0 | −7.96 | −7.58 |
| 1,000 | +1.37 | +1.41 |

For both the calcite suspension and oil emulsion, a significant change from negative electrokinetic potential to positive electrokinetic potential was observed. The data suggests that manganese dichloride is not useful with low-salinity manganese-bearing aqueous solutions to alter wettability toward water-wet.

Precipitation of Manganese Carbonate in High Salinity Manganese-Bearing Aqueous Solutions Two calcite suspensions having high salinity manganese-bearing aqueous solutions were observed for the precipitation of manganese carbonate. The manganese-bearing aqueous solutions were prepared by mixing a manganese salt, manganese sulfate and manganese dichloride respectively, with natural seawater so that each solution had a concentration of 1,000 ppm TDS manganese ions. The amount of manganese in the natural seawater used in each of the solutions was negligible. Each of the solutions appeared stable, with no precipitation of manganese carbonate observed.

Precipitation of Manganese Carbonate in Low-Salinity Manganese-Bearing Aqueous Solutions Two calcite suspensions having low-salinity manganese-bearing aqueous solutions were observed for the precipitation of manganese carbonate. The manganese-bearing aqueous solutions were prepared by mixing a manganese salt, manganese sulfate and manganese dichloride respectively, with a low-salinity aqueous saline solution having major ionic concentration of 5,761 ppm TDS. The concentrations of major ions in the low-salinity aqueous saline solution were: sodium ion 1824 ppm TDS, magnesium ion 211 ppm TDS, calcium ion 65 ppm TDS, sulfate ion 429 ppm TDS, chloride ion 3220 ppm TDS, and bicarbonate ion 12 ppm TDS. The aqueous saline solution did not have a significant concentration of manganese ions before mixing with the manganese salt.

No evidence of precipitation was observed in the solution prepared from manganese sulfate. However, manganese carbonate precipitation was observed in the solution prepared from manganese dichloride. When the manganese salt used to prepare the solution is manganese dichloride, it is believed that a sufficient concentration of magnesium ions (such as the concentration of magnesium in natural seawater) is needed to prevent the nucleation of manganese carbonate in solution. The precipitation of manganese carbonate is believed to interfere with favorable wettability alteration at calcite and oil interfaces.

What is claimed is:

1. A method for enhancing oil recovery in a hydrocarbon-containing carbonate reservoir, comprising:
    injecting a slug of an oil recovery solution into the hydrocarbon-containing carbonate reservoir, the oil recovery solution altering the wettability of a rock surface of the hydrocarbon-containing carbonate reservoir, the oil recovery solution comprising:
        a manganese-bearing aqueous solution comprising manganese ions and major ions, the manganese-bearing aqueous solution having a concentration of manganese ions ($Mn^{2+}$) and a concentration of major ions, the major ions comprising at least one of: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$); wherein the concentration of manganese ions is between 100 and 1,000 parts per million (ppm) total dissolved solids (TDS) and the concentration of major ions is equivalent to the concentration of major ions in natural seawater; and
    injecting a slug of a displacing fluid into the hydrocarbon-containing carbonate reservoir after injecting the slug of the oil recovery solution.

2. The method of claim 1, wherein the oil recovery solution comprises manganese sulfate ($MnSO_4$).

3. The method of claim 1, wherein the oil recovery solution comprises manganese dichloride ($MnCl_2$).

4. The method of claim 1, wherein the slug of the oil recovery solution has a volume between 0.3 and 0.5 pore volumes of the hydrocarbon-containing carbonate reservoir.

5. The method of claim 1, wherein the slug of the displacing fluid has a volume between 0.5 and 1.0 pore volumes of the hydrocarbon-containing carbonate reservoir.

6. The method of claim 1, wherein the concentration of major ions in the manganese-bearing aqueous solution is between 34,000 and 60,000 ppm TDS.

7. The method of claim 1, wherein the displacing fluid comprises seawater.

8. A method for enhancing oil recovery in a hydrocarbon-containing carbonate reservoir, comprising:
  injecting a slug of an oil recovery solution into the hydrocarbon-containing carbonate reservoir, the oil recovery solution altering the wettability of a rock surface of the hydrocarbon-containing carbonate reservoir, the oil recovery solution comprising:
    a manganese-bearing aqueous solution comprising manganese ions ($Mn^{2+}$) and major ions, the manganese-bearing aqueous solution having a concentration of manganese ions between 100 and 1,000 ppm TDS and a concentration of major ions between 5,000 and 7,000 ppm TDS, the major ions comprising at least one of: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$); and
  injecting a slug of a displacing fluid into the hydrocarbon-containing carbonate reservoir after injecting the slug of the oil recovery solution.

9. The method of claim 8, wherein the manganese-bearing aqueous solution comprises manganese sulfate ($MnSO_4$).

10. The method of claim 8, wherein the slug of the oil recovery solution has a volume between 0.3 and 0.5 pore volumes of the hydrocarbon-containing carbonate reservoir.

11. The method of claim 8, wherein the slug of the displacing fluid has a volume between 0.5 and 1.0 pore volumes of the hydrocarbon-containing carbonate reservoir.

12. The method of claim 8, wherein the displacing fluid comprises seawater.

13. A method for enhancing oil recovery in a hydrocarbon-containing carbonate reservoir, comprising:
  injecting a slug of a first oil recovery solution into the hydrocarbon-containing carbonate reservoir, the oil recovery solution altering the wettability of a rock surface of the hydrocarbon-containing carbonate reservoir, the first oil recovery solution comprising:
    a manganese-bearing aqueous solution comprising manganese ions and major ions, and having a concentration of manganese ions between 100 and 1,000 ppm TDS and concentration of major ions between 5,000 and 7,000 ppm TDS, the major ions comprising at least one of: sodium ion ($Na^+$), magnesium ion ($Mg^{2+}$), calcium ion ($Ca^{2+}$), chlorine ion ($Cl^-$), sulfate ion ($SO_4^{2-}$), and bicarbonate ion ($HCO_3^-$);
  injecting a slug of a second oil recovery solution into the hydrocarbon-containing carbonate reservoir formation after injecting the slug of the first oil recovery solution, the second oil recovery solution comprising:
    a nonmanganese-bearing aqueous solution having a concentration of major ions between 5,000 and 7,000 ppm TDS, and a concentration of manganese ions that is less than 100 ppm TDS; and
  injecting a slug of a displacing fluid into the hydrocarbon-containing carbonate reservoir formation after injecting the slug of the second oil recovery solution.

14. The method of claim 13, wherein the first oil recovery solution comprises manganese sulfate ($MnSO_4$).

15. The method of claim 13, wherein the slug of the first oil recovery solution has a volume between 0.3 and 0.5 pore volumes of the hydrocarbon-containing carbonate reservoir.

16. The method of claim 13, wherein the slug of the second oil recovery solution has a volume between 0.3 and 0.5 pore volumes of the hydrocarbon-containing carbonate reservoir.

17. The method of claim 13, wherein the slug of the displacing fluid has a volume between 0.5 and 1.0 pore volumes of the hydrocarbon-containing carbonate reservoir.

18. The method of claim 13, wherein the displacing fluid comprises seawater.

* * * * *